(No Model.)
B. GOLDENSKY.
TRUCK.
No. 523,520. Patented July 24, 1894.
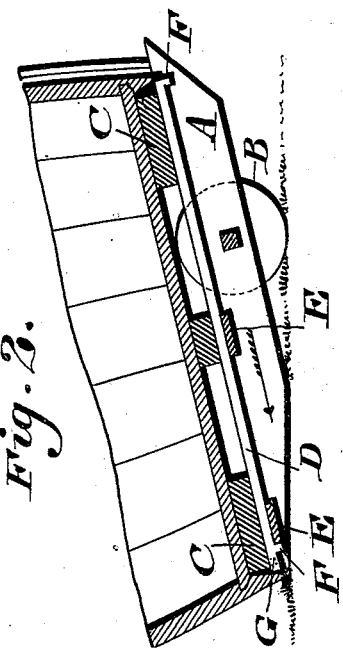
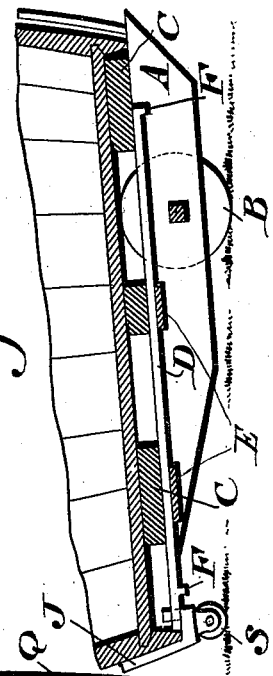
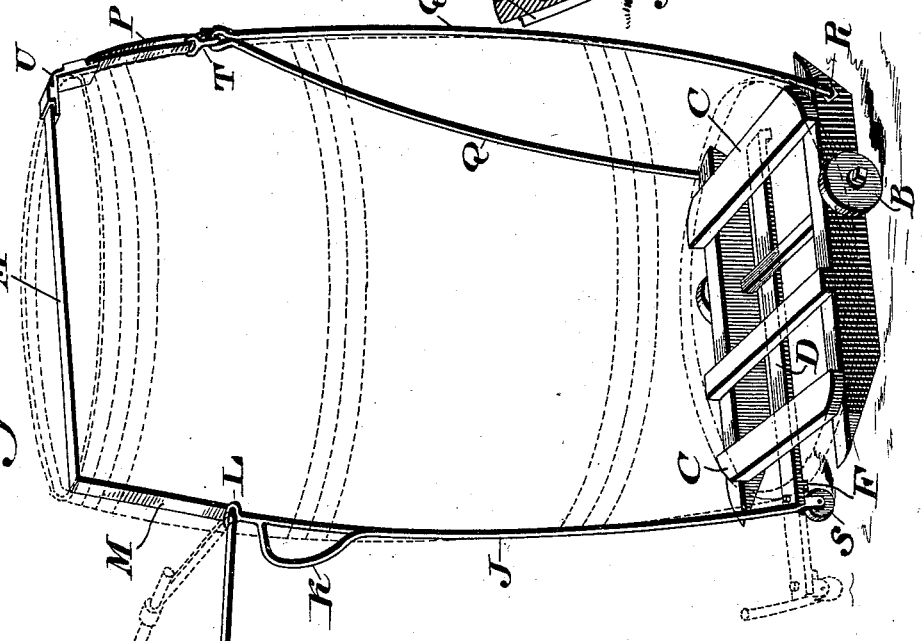
WITNESSES:
O. F. Nagle.
L. Douville.
INVENTOR
Bension Goldensky
BY John A. Wiederstein
ATTORNEY.

ature between.
UNITED STATES PATENT OFFICE.

BENSION GOLDENSKY, OF PHILADELPHIA, PENNSYLVANIA.

TRUCK.

SPECIFICATION forming part of Letters Patent No. 523,520, dated July 24, 1894.

Application filed February 16, 1894. Serial No. 500,337. (No model.)

*To all whom it may concern:*

Be it known that I, BENSION GOLDENSKY, a subject of the Czar of Russia, residing in the United States one year last past and having declared my intention of becoming a citizen thereof, residing in the city and county of Philadelphia, State of Pennsylvania, have invented a new and useful Improvement in Trucks for Ash, Garbage, and other Barrels, which improvement is fully set forth in the following specification and accompanying drawings.

My invention consists of a truck, more particularly designed for household purposes such as transporting or conveying ash and offal barrels, the same embodying means as hereinafter described whereby the truck may be readily tilted, the capacity of the truck may be increased for barrels of greater diameters, and the barrels may be firmly held on the truck, and conveying operations readily performed.

Figure 1 represents a perspective view of a truck embodying my invention. Figs. 2 and 3 represent sections of the same, and a portion of the barrel thereon. Fig. 4 represents a perspective view of detached portions.

Similar letters of reference indicate corresponding parts in the several figures.

Referring to the drawings: A designates a truck on whose sills the wheels B are mounted eccentrically, so that the truck is permitted to tilt. On the top of the truck are battens C, which have rounded ends and are of such length and so disposed, that when the bottom of the barrel is rested thereon, its chine embraces said battens, and thus the barrel is prevented from slipping, it being evident that said barrel may be readily conveyed to the desired place, after which the truck is permitted to tilt, whereby the chine may rest on the pavement or ground, as shown in Fig. 2, so that by properly manipulating or lifting the barrel, the truck may be readily withdrawn from thereunder.

In order to adapt the truck for barrels of larger diameters, I employ the sliding bar or extensible arm D, which is connected with the frame of the truck by means of the keepers E, whereby said bar may be drawn out, as shown in Fig. 3, the motion of the bar in either direction being limited by shoulders or stops F, formed on the same.

In the end of the bar is an opening G which is adapted to receive the pin H, which rises from the bottom limb T of the standard J, the upper portion of the standard being formed with a handle K and eye L, through which eye is passed the strap or rope M, which is provided with a handle N and a loop P, with which latter is connected the standards of the frame Q, the lower ends whereof are pivotally attached as at R to the sills of the truck opposite to the standard J, said frame being somewhat wide in its nature.

The lower limb T of the standard J has mounted on it a roller S, which when the truck is in position as in Fig. 3, is on the pavement or ground, and the truck with its load, when heavy, may be readily moved from place to place on the wheels B and said roller as desired, it being noticed that part of the chine embraces one of the battens C, and the opposite part thereof rests on said limb T, it being noticed that when the barrel is thus located, it occupies a position between the frame Q and standard J, and the strap M is run over the top of the barrel, so that when the strap is tightened, the barrel will be securely held on the truck and the truck may be readily moved by a person grasping the handles N and K, so that the truck may be easily guided, and the barrel remains seated on the truck.

When the place of location of the barrel is reached, the strap M is loosened or released, whereby the frame Q is relieved, and the standard J with its parts is disconnected from the arm D, after which the truck may be tilted, and the barrel removed therefrom, as previously set forth.

In order to prevent the strap from being cut through where it presses on the top chine of the barrel, I apply to said strap the bent guard U, of metal or other suitable material, a portion of the strap passing through the same, and thus being held from contact with the chine.

The strap M may be disconnected from the frame Q, owing to the hook T on the latter, whereby said strap and standard J may be removed, and afterward formed into a bundle, hung-up in a dry place or otherwise stowed away, and thus be prevented from being stolen, lost or damaged, it being seen that the barrel may remain on the truck ready for further use. The ends of the sills are beveled on their under sides, so as to permit the tilting of the truck to sufficient extent, as will be seen in Fig. 2.

Having thus described my invention, what I claim as new, and desire to secure by Letters Patent, is—

1. A truck having a frame consisting of sills and battens, with wheels mounted eccentrically on said sills, said battens being rounded on their outer ends and said sills being beveled on their under sides and an extensible arm on said frame substantially as described.

2. A truck having a frame consisting of sills and battens and an extensible arm guided in keepers on said frame, said battens having rounded outer ends, substantially as described.

3. A truck having a frame, an extensible arm guided in said frame, and having an opening in one end, a standard with a limb having a pin entering said opening and a roller on said limb, said parts being combined substantially as described.

4. A truck having a frame with running gear, a standard connected with one side of said frame having an eye at its upper end, a frame pivotally attached to said first mentioned frame opposite said standard and a strap connected with said eye and having a handle at one end and at the other end a loop for attachment to said pivoted frame, said parts being combined substantially as described.

5. A truck having a standard rising from the frame thereof, in combination with a frame pivotally connected with said frame of the truck, a tightening strap which connects said standard, with said pivoted frame and a guard on said strap, substantially as described.

6. A truck having a frame consisting of sills and battens, an extensible arm guided in keepers on said frame, stationary and pivoted standards on said frame, an arm, and a strap connecting said standards, said parts being combined substantially as described.

BENSION GOLDENSKY.

Witnesses:
JOHN A. WIEDERSHEIM,
WM. C. WIEDERSHEIM.